United States Patent
Sun (10) Patent No.: US 12,537,774 B2
(45) Date of Patent: Jan. 27, 2026

(54) SYSTEMS AND METHODS FOR CONGESTION AND FLOW CONTROL IN NETWORKS

(71) Applicant: Lemon Inc., Grand Cayman (KY)

(72) Inventor: Yan Sun, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 18/392,575

(22) Filed: Dec. 21, 2023

(65) Prior Publication Data

US 2025/0211540 A1 Jun. 26, 2025

(51) Int. Cl.
*H04L 47/27* (2022.01)
*H04L 47/12* (2022.01)

(52) U.S. Cl.
CPC .............. *H04L 47/27* (2013.01); *H04L 47/12* (2013.01)

(58) Field of Classification Search
CPC ................................ H04L 47/27; H04L 47/12
See application file for complete search history.

(56) References Cited

U.S. PATENT DOCUMENTS

| | | | | |
|---|---|---|---|---|
| 6,625,118 B1 * | 9/2003 | Hadi Salim | ............. | H04L 47/33 370/236 |
| 2005/0226150 A1 * | 10/2005 | Santos | .................... | H04L 47/10 370/230 |
| 2011/0013511 A1 * | 1/2011 | Li | ..................... | H04W 28/0242 370/231 |
| 2012/0063493 A1 * | 3/2012 | Hasegawa | ............. | H04L 47/724 375/296 |
| 2019/0199643 A1 * | 6/2019 | Skarve | ............. | H04W 28/0284 |
| 2021/0112002 A1 | 4/2021 | Pan et al. | | |

OTHER PUBLICATIONS

Carfiglio et al., "Optimal Multipath Congestion Control and Request Forwarding in Information-Centric Networks," Computer, Jul. 1988, 21(7):34-45.
Carfiglio et al., "Optimal multipath congestion control and request forwarding in information-centric networks: Protocol design and experimentation," Computer Networks, Dec. 2016, 110:104-117.
Extended European Search Report in European Appln No. 24208232.9, dated Mar. 26, 2025, 9 pages.

* cited by examiner

*Primary Examiner* — Azizul Choudhury
(74) *Attorney, Agent, or Firm* — Fish & Richardson P.C.

(57) ABSTRACT

Congestion windows are controlled from a receiver in a communications network, and then provided to senders to control flow of packets within the network. The congestion window can be dynamically adjusted based on detection of one of packet loss, a congestion signal and a packet latency signal. The congestion window can be further adjusted for fairness or flow control based on bandwidth use. The sender node receives the congestion window and controls sending rates according to the congestion window. The sender node can determine packet loss and further adjust the congestion window.

20 Claims, 3 Drawing Sheets

SYSTEMS AND METHODS FOR CONGESTION AND FLOW CONTROL IN NETWORKS

FIELD

This disclosure is directed to systems and methods for providing congestion control and flow control in networks, particularly using receiver nodes to determine the congestion windows for sender nodes.

BACKGROUND

Network communication protocols such as transmission control protocol (TCP) can include controls on flow rates of packets sent by senders to reduce congestion issues. The senders can send TCP packets and adjust the rate of sending based on observable events such as packet loss. Congestion control at the sender can use an existing scheme such as an additive increase/multiplicative decrease (AIMD) approach.

SUMMARY

This disclosure is directed to systems and methods for providing congestion control and flow control in networks, particularly using receiver nodes to determine the congestion windows for sender nodes.

By making congestion control and flow control determinations at a receiver node, the congestion control and flow control determinations can be based on more complete information regarding network conditions, beyond just dropping of packets. The more complete information can account for the behavior of multiple sender nodes. Further, the congestion control and flow control can be based on one-way latency values, which can be more accurate compared to the round-trip-time (RTT) based approaches required when the sender is tasked with congestion control. Additionally, combining both congestion control and flow control such that they are performed together can improve the efficiency and ensure that the congestion control and flow control are not in conflict with one another.

In an embodiment, a computer network includes a receiver node configured to receive packets of data from one or more sender nodes. The receiver node is configured to determine network congestion. The receiver node is further configured to, based on the determination of the network congestion, determine a congestion window for the one or more sender nodes and transmit the congestion window to the one or more sender nodes.

In an embodiment, the receiver node is configured to detect packet loss in the packets of data received from the one or more sender nodes, detect an explicit congestion notification (ECN) in the packets of data received from the one or more sender nodes, and determine a one-way latency of the packets of data received from the one or more sender nodes.

In an embodiment, the computer network further includes the one or more sender nodes, and wherein each of the one or more sender nodes are configured to receive the congestion window for said sender node from the receiver node, and control the sending of packets from said sender node based on the congestion window. In an embodiment, at least some of the one or more sender nodes are configured to detect packet loss for first and final packets of the packets of data sent from said sender note to the receiver node and reduce the congestion window when the packet loss for first and final packets is detected.

In an embodiment, the receiver node is configured to determine the one-way delay by determining a difference between a time at the receiver and a timestamp at a sending for a plurality of packets of the packets of data from the one or more sender nodes.

In an embodiment, the receiver node is configured such that when the packet loss is detected by the receiver node, the receiver node determines to reduce the congestion window.

In an embodiment, the receiver node is configured such that when packet loss is not detected by the receiver node and the ECN is detected by the receiver node, the receiver node determines to reduce the congestion window.

In an embodiment, the receiver node is configured such that when packet loss is not detected by the receiver node and the ECN is not detected by the receiver node, one-way latency is compared to a target one-way latency, and when the one-way latency exceeds the target one-way latency, the receiver node determines to reduce the congestion window.

In an embodiment, the receiver node is further configured to adjust the congestion window for a respective one of the one or more sender nodes based on a comparison of a bandwidth for a flow from the respective sender note to an average bandwidth of flows from the one or more sender nodes. In an embodiment, different sender nodes of the one or more sender nodes have differing priorities, and the receiver node is configured to adjust the congestion window based on the priority of the respective sender node.

In an embodiment, a method for controlling flow in a computer network includes, at a receiver node configured to receive packets of data from one or more sender nodes, determining network congestion. The method also includes determining, at the receiver node, a congestion window for the one or more sender nodes based on the determining of network congestion.

In an embodiment, the determining of congestion on the network includes detecting packet loss in the packets of data received from the one or more sender nodes. The method further includes, at the receiver node, detecting an explicit congestion notification (ECN) in the packets of data received from the one or more sender nodes. The method also includes, at the receiver node, determining a one-way latency of the packets of data received from the one or more sender nodes In an embodiment, the method further includes receiving, at the one or more sender nodes, the congestion window for said sender node from the receiver node, and operating said sender node to send packets to the receiver node based on the congestion window. In an embodiment, the method further includes detecting, at the one or more sender nodes, packet loss for first and final packets of the packets of data sent from said sender note to the receiver node and reduce the congestion window when the packet loss for first and final packets is detected.

In an embodiment, wherein determining the one-way delay includes determining a difference between a time at the receiver and a timestamp at a sending for a plurality of packets of the packets of data from the one or more sender nodes.

In an embodiment, when the packet loss is detected by the receiver node, the receiver node determines to reduce the congestion window.

In an embodiment, when packet loss is not detected by the receiver node and the ECN is detected by the receiver node, the receiver node determines to reduce the congestion window.

In an embodiment, when packet loss is not detected by the receiver node and the ECN is not detected by the receiver node, one-way latency is compared to a target one-way latency, and when the one-way latency exceeds the target one-way latency, the receiver node determines to reduce the congestion window.

In an embodiment, the method further includes adjusting the congestion window for a respective one of the one or more sender nodes based on a comparison of a bandwidth for a flow from the respective sender note to an average bandwidth of flows from the one or more sender nodes.

In an embodiment, different sender nodes of the one or more sender nodes have differing priorities, adjusting the congestion window based on the priority of the respective sender node.

In an embodiment, a non-transitory computer-readable medium has computer-executable instructions stored thereon that, upon execution, cause one or more processors of a receiver node of a computer network to perform operations including detecting an explicit congestion notification (ECN) in the packets of data received from the one or more sender nodes, determining a one-way latency of the packets of data received from the one or more sender nodes, determining a congestion window for the one or more sender nodes based on at least one of the detection of packet loss, detection of the ECN, or the one-way latency, and transmitting the congestion window from the receiver node to the one or more sender nodes.

In an embodiment, determining the congestion window includes, when the packet loss is detected by the receiver node, determining to reduce the congestion window. Determining the congestion window further includes, when packet loss is not detected by the receiver node and the ECN is detected by the receiver node, determining to reduce the congestion window. Determining the congestion window also includes, when packet loss is not detected by the receiver node and the ECN is not detected by the receiver node, one-way latency is compared to a target one-way latency, and when the one-way latency exceeds the target one-way latency, determining to reduce the congestion window.

In an embodiment, a computer network includes a receiver node configured to receive packets of data from one or more sender nodes. The receiver node is configured to, based on detection of one of packet loss, a congestion signal and a packet latency signal, from one or more sender nodes, dynamically adjust a congestion window to be sent to the one or more sender nodes and transmit the congestion window to the one or more sender nodes.

In an embodiment, a method for controlling flow in a computer network includes, at a receiver node configured to receive packets of data from one or more sender nodes, based on detection of one of packet loss, a congestion signal and a packet latency signal, from one or more sender nodes, dynamically adjusting a congestion window to be sent to the one or more sender nodes and transmitting the congestion window from the receiver node to the one or more sender nodes.

In an embodiment, a non-transitory computer-readable medium has computer-executable instructions stored thereon that, upon execution, cause one or more processors of a receiver node of a computer network to perform operations. The operations include, based on detection of one of packet loss, a congestion signal and a packet latency signal, from one or more sender nodes, dynamically adjusting a congestion window to be sent to the one or more sender nodes and transmitting the congestion window from the receiver node to the one or more sender nodes.

DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Non-limiting and non-exhaustive descriptions are described with reference to the following drawings. The components in the figures are not necessarily to scale, emphasis instead being placed upon illustrating principles. In the detailed description that follows, embodiments are described as illustrations only since various changes and modifications may become apparent to those skilled in the art from the following detailed description.

DETAILED DESCRIPTION

This disclosure is directed to systems and methods for providing congestion control and flow control in networks, particularly using receiver nodes to determine the congestion windows for sender nodes.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

As referenced herein, "congestion window" is a term of art referring to control of the rate of sending by a sender node of a network. In particular, the congestion window can be a limit on a total number of unacknowledged packets that may be in transit at one time. When the number of unacknowledged packets meets or exceeds the congestion window, the sender can stop sending data until acknowledgements are received. The term congestion window can be abbreviated as CWND. As used herein, when the congestion window is increased (i.e. being adjusted upwards), an amount of unacknowledged packets from the sender can be increased. The ability to send more packets without requiring acknowledgements can thereby increase a sending rate from the sender. Increasing the sending rate from the sender node can facilitate faster exchange of data across the network. As used herein, when the congestion window is decreased (i.e. being adjusted downwards), the number of unacknowledged packets before sending is suspended is reduced. The reduction in the number of unacknowledged packets allowed before sending additional packets can thereby reduce a sending rate from the sender node of the network. Decreasing the sending rate from the sender node can reduce network congestion and reduce packet loss, buffer filling, other delays, and the like, thereby improving the efficiency of communications on the network.

Figure 1:
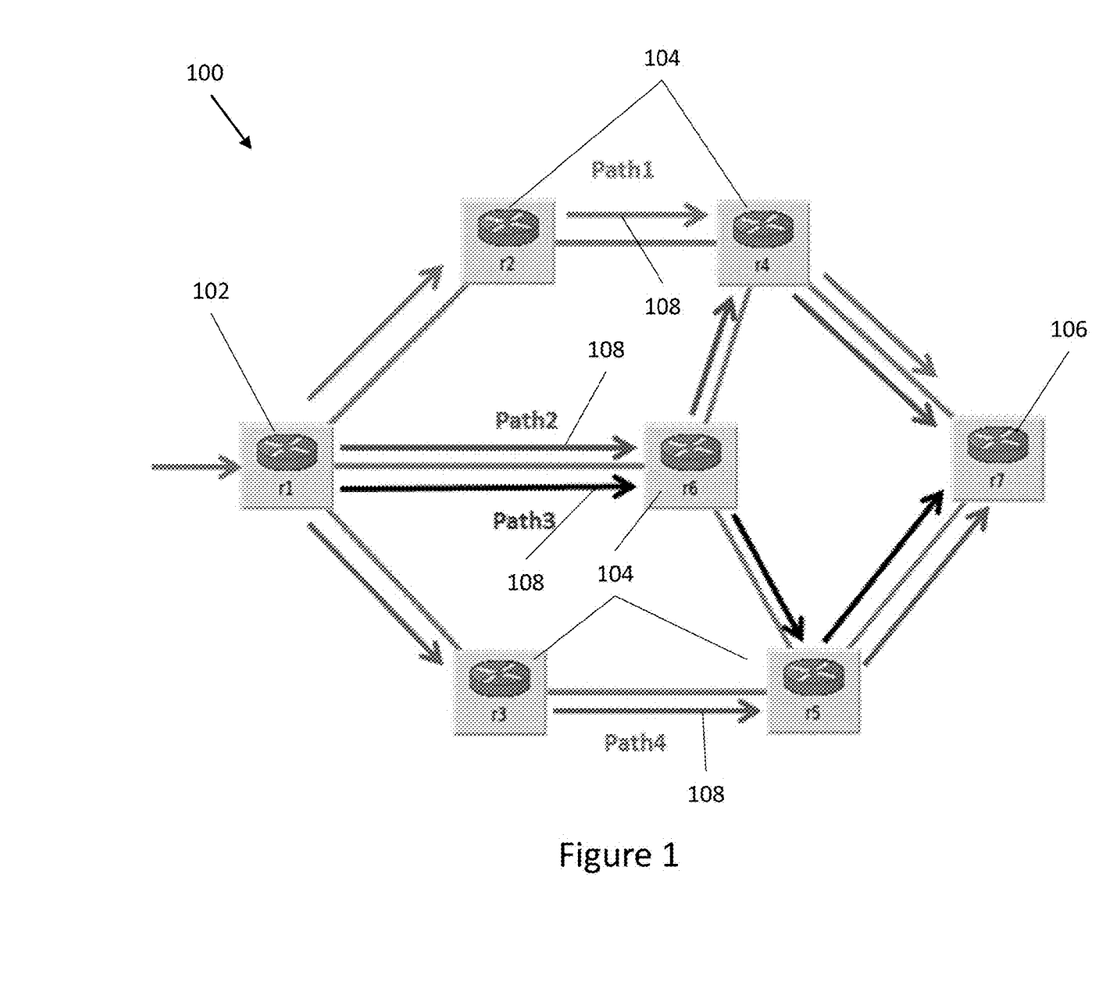
FIG. 1 shows a network according to an embodiment.

FIG. 1 shows a network according to an embodiment. Network 100 includes a sender 102, a plurality of switches 104, and a receiver 106. The plurality of switches provide multiple flow paths 108 between the sender node 102 and the receiver node 106. Network 100 is a network on which the congestion and flow controls as described herein can be implemented. As shown in FIG. 1, network 100 is a multipath network including multiple flow paths 108 from sender 102 to receiver 106. It is understood that congestion and flow controls as described herein can be applied to single- or multi-path networks 100 to govern the rate of packet sending by the sender 102 based on a congestion window determined at the receiver 106 based on the packets received. In alternative embodiments, network 100 can instead be any suitable network allowing packets of data to be communicated from sender 102 to the receiver 106.

Sender 102 transmits packets of data to receiver 106 by way of network 100. Sender 102 can be, for example, a server, any other suitable computer, a personal device such as a smartphone, tablet, or the like. The packets of data can be packets under any suitable protocol for data transfer, such as TCP. The sender 102 further receives acknowledgements of received packets according to the protocol being used. When sender 102 transmits packets at a rate that exceeds the bottleneck capacity of network 100, a router at the bottleneck (e.g. one of switches 104) can place packets into a buffer. If the sender 102 provides packets faster than the packets can leave the buffer, the buffer will fill and eventually packets will be dropped when there is no capacity in the buffer. In the embodiment shown in FIG. 1, the sender 102 is further configured to obtain a congestion window from acknowledgements received from the receiver 106. The congestion window governs the behavior of sender 102 by limiting the number of packets that can be sent without acknowledgement at a given time. The sending rate of the sender 102 can increase when the congestion window increases, and decrease when the congestion window decreases. In embodiments, the sender 102 can be configured to detect packet loss, for example when acknowledgements are not received for packets that have been sent. In embodiments, the sender 102 can be configured to attach a congestion signal to the packets being sent when there is congestion. A non-limiting example of a congestion signal is an explicit congestion notification (ECN). In embodiments, the sender 102 can be configured to detect packet loss for packets where packet loss may not be observable to receiver 106, for example for the first or final packets of a particular data flow from sender 102 to receiver 106. In such embodiments, the sender 102 can be configured to adjust the congestion window at the sender 102 based on the detection of packet loss at sender 102, without requiring a congestion window provided in an acknowledgement from receiver 106. Non-limiting examples of the adjustment of congestion window at sender 102 in response to detected packet loss are further described with respect to step 320 of method 300 shown in FIG. 3 and described below.

A plurality of switches 104 can be provided between the sender 102 and receiver 106 to define multiple flow paths 108. In an embodiment, routing protocols can be used to split flows across the multiple flow paths 108 according to multi-path TCP. In an alternative embodiment, the packets can be communicated from sender 102 to receiver 106 by any suitable single flow path, for example according to known TCP/IP protocols. In embodiments described herein, the congestion and flow controls can be implemented by the sender 102 and receiver 106, without regard to the flow path or paths 108 therebetween or constituents of such flow paths 108, for example, the switches 104.

Receiver 106 is configured to receive data flows from the sender 102 by way of one or more of the flow paths 108. Receiver 106 can be, for example, a server, any other suitable computer, a personal device such as a smartphone, tablet, or the like. Receiver 106 is configured to receive packets of the data flow from sender 102 and determines a congestion window based on the characteristics and/or contents of the packets. For example, receiver 106 can be configured to detect congestion and reduce a congestion window based on one or more of detection of packet loss, detection of congestion signals attached to the packets, and/or determinations of delay such as a one-way latency of the received packets. The determined congestion window can be transmitted to the sender 102 to govern future sending of packets by said sender 102. In an embodiment, the determined congestion window can be included in, attached to, or sent with acknowledgements of packets that are sent from receiver 106 to sender 102. In an embodiment, the receiver 106 can include one or more latency calculators, congestion window calculators, and/or flow control and fairness modules as discussed below and shown in FIG. 2. In a non-limiting example, the receiver 106 can be configured to determine congestion windows according to method 300 as shown in FIG. 3 and discussed below.

Figure 2:
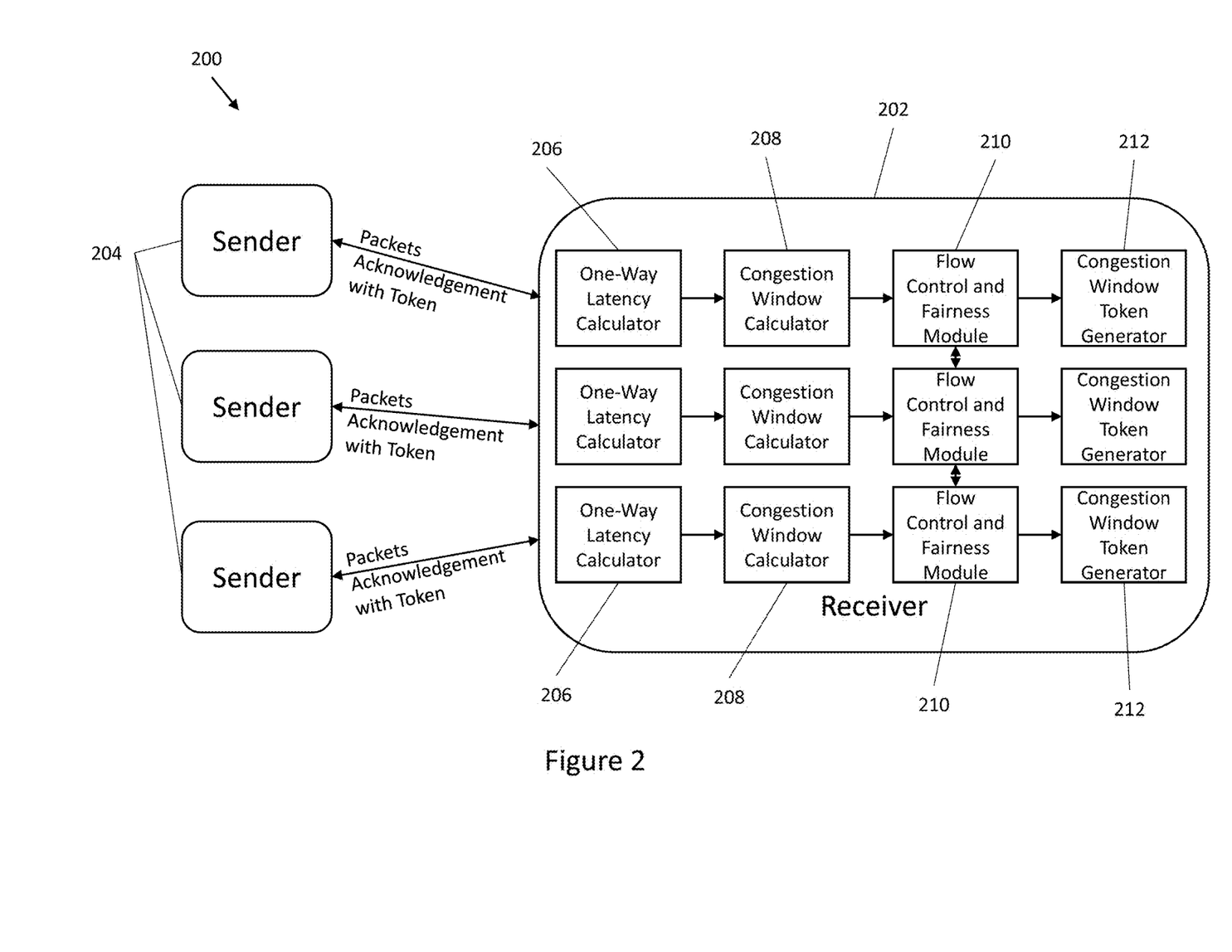
FIG. 2 shows a schematic of a congestion and flow control system according to an embodiment.
Figure 3:
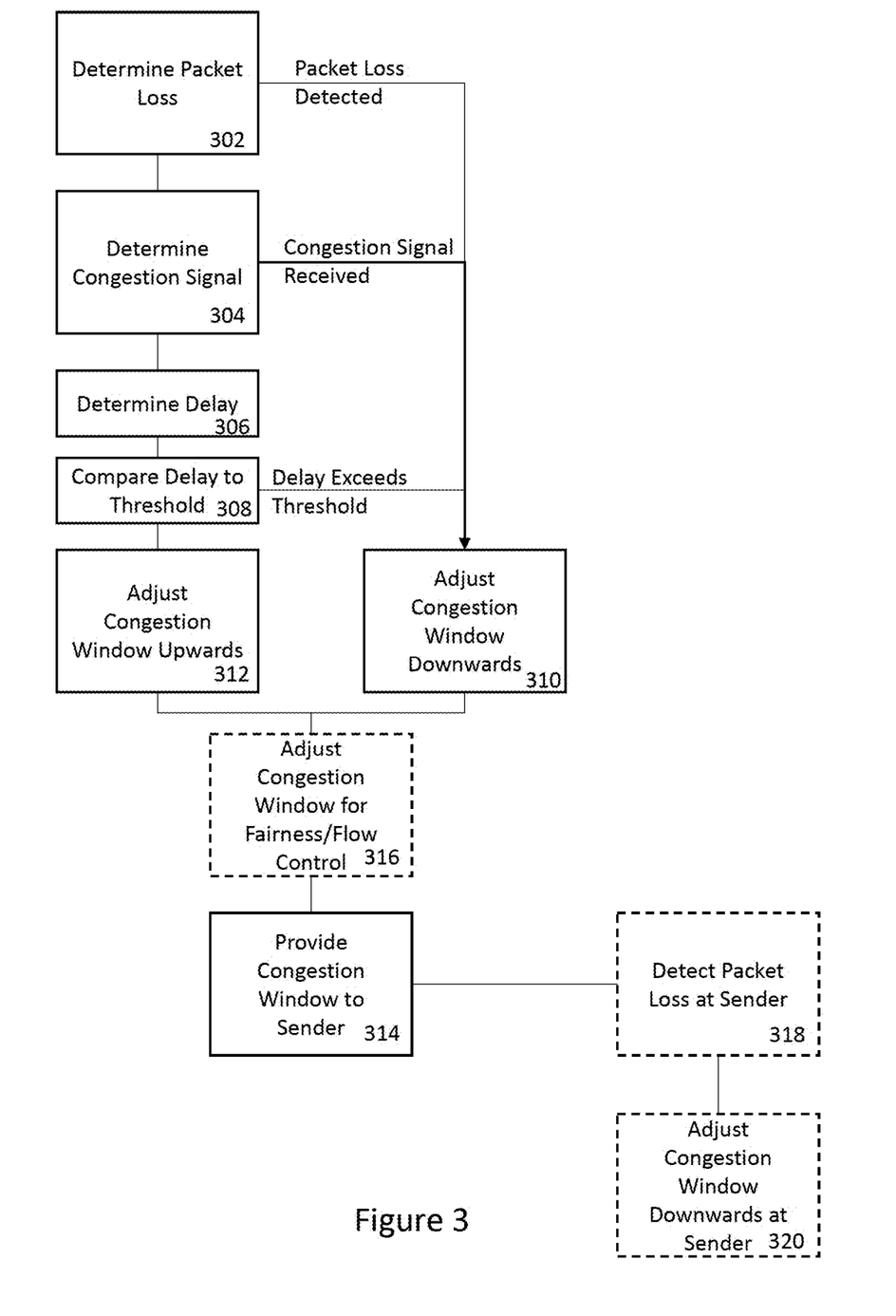
FIG. 3 shows a flowchart of a method according to an embodiment.

FIG. 2 shows a schematic of a congestion and flow control system according to an embodiment. Congestion and flow control system 200 is provided at a receiver 202. Receiver 202 is in communication with one or more sender(s) 204.

The congestion and flow control system 200 includes latency calculator(s) 206 for each of the sender(s) 204. The congestion and flow control system 200 further includes congestion window calculator(s) 208 for each of the sender(s) 204. The congestion and flow control system 200 includes flow control and fairness module(s) 210. The congestion and flow control system also includes congestion window token generator(s) 212.

Congestion and flow control system 200 is a system configured to allow packets of data to be sent from one or more sender(s) 204 to a receiver 202. The congestion and flow control system 200 can include any suitable hardware, software, combinations thereof, and the like such that the packets of data can be transmitted from sender(s) 204 to receiver 202.

Receiver 202 is configured to receive data from one or more sender(s) 204. The receiver 202 can include, for example, a server, any other suitable computer, a personal device such as a smartphone, tablet, or the like. The receiver 202 can have suitable data connections to the one or more sender(s) 204, such as any suitable wired or wireless connection to one or more of the internet, a local network such as an intranet, or the like. The receiver 202 can use any suitable protocol, such as the TCP/IP protocol for receiving the data packets from the sender(s) 204. Receiver 202 can include a plurality of modules, the modules including any suitable hardware, software, or combinations thereof. The plurality of modules included in the receiver 202 can include one or more latency calculator(s) 206, one or more congestion window calculator(s) 208, one or more flow control and fairness module(s) 210, and/or one or more congestion window token generator(s) 212 as discussed further below.

Sender(s) 204 are configured to send data packets to the receiver 202. Sender(s) 204 can be nodes of a network including receiver 202. The sender(s) can be any suitable source of data packets. The sender 204 can send the data packets to receiver 202 by any suitable hardware, software, and combinations thereof, according to any suitable protocol. The data packets from the sender 204 can pass through any suitable layers and/or pathways to reach the receiver, for example multiple layers of the TCP/IP model. There can be multiple senders 204 each sending packets to the receiver 202 by respective suitable networks. The networks by which the senders 204 send the packets to the receiver 202 can include one or more of the internet, local networks such as intranets, and the like. The networks by which the sender 204 send the packets to the receiver 202 can include any one or more suitable methods for transmission and receipt of the packets of data, such as any suitable wired or wireless connections, and can include any suitable hardware, software, combinations thereof, and the like to allow for the transmission of the data packets from the sender(s) 204 to receiver 202. Senders 204 are configured to receive acknowledgements from the receiver 202 upon receipt of packets from the sender. The senders 204 can each control their respective rate of sending of packets based on the congestion window and the acknowledgements, with the congestion window governing the number of packets that can be sent without requiring acknowledgement from the receiver 202. The sender(s) 204 in congestion and flow control system 200 are configured to receive acknowledgements that include a congestion window, and to operate according to the congestion window from the acknowledgement. In one non-limiting embodiment, sender(s) 204 can further be configured to adjust the congestion window based on events that may not be readily detectable by the receiver 202 in said embodiment, such as packet loss for first or final packets of a transmission, or the like, with the congestion window for that respective sender 204 being, for example, adjusted downwards when packet loss is detected for first or final packets of the transmission.

Latency calculator(s) 206 can be provided at receiver 202 for each of the one or more sender(s) 204 that receiver 202 is receiving packets from. Latency calculator(s) 206 are each modules that can include software, hardware, combinations thereof, or the like and are provided as part of receiver 202. The latency calculator(s) 206 are each configured to determine a one-way latency for the packets received from the respective sender 204 that the latency calculator is associated with. The one-way latency value can be calculated at the latency calculator(s) 206 by subtracting a time at which the packet was received at the receiver 202 ("$T_{receiver}$") from the time at which the packet was sent from the respective sender 204 ("$T_{sender}$"). The $T_{sender}$ can be determined based on the received packet, for example by a timestamp attached to the packet when sent by the sender 204. In some embodiments, the determination of $T_{sender}$ can be performed without requiring further communication with the sender 204 beyond receipt of the packet. In some embodiments, a constant value can also be added, for example to avoid the delay value being negative. Accordingly, the formula for determining the one-way latency can, in a non-limiting embodiment, be: $(T_{receiver}-T_{sender})+C$. The one-way latency values determined at latency calculator 206 can be monitored over time, such as to determine rates of change, minimum and maximum values within a predetermined window of time, to determine one-way latency values that are smoothed over time, or the like.

Congestion window calculator(s) 208 are configured to, based on the received packets and the one-way latencies determined by the respective latency calculator(s) 208 to determine the congestion window. Congestion window calculator(s) 208 are each modules that can include software, hardware, combinations thereof, or the like and are provided as part of receiver 202. A congestion window calculator 208 can be provided for each sender 204 that packets are being received from at the receiver 202. The congestion window calculator(s) 208 can use any suitable approach for determining the congestion window based on the information available at the receiver 202 based on the received packets. In an embodiment, the congestion window calculator(s) 208 can each determine the congestion window for the respective sender 202 based on one or more of detection of packet loss, inclusion of an explicit congestion notification (ECN) in the received packets, and/or the one-way latency. In embodiments, one or more of the instant one-way latency value, a smoothed value of the one-way latency, and/or a minimum or maximum value for the one-way latency within a predetermined time window can be compared to a target or threshold value to determine if the congestion window is to be reduced based on the one-way latency. In an embodiment, the congestion window calculator can prioritize packet loss, inclusion of the ECN, and the one-way latency, in that descending order, when determining the congestion window. In embodiments, the congestion window calculator(s) 208 can reduce the congestion window according to a first reduction when packet loss is detected, reduce the congestion window according to a second reduction when an ECN is detected, and reduce the congestion window by a third reduction when the one-way latency exceeds a threshold value. In an embodiment, the reduction of the congestion window when packet loss is detected can be a multiplicative reduction, such as halving the congestion window when packet loss is detected at the receiver 202. In an embodiment, the reduction of the congestion window when an ECN is detected can be based on a fraction of the packets received within a defined time window that include the ECN. In an embodiment, the reduction of the congestion window when the one-way latency exceeds a threshold value can be based on the extent to which the one-way latency exceeds the threshold value. In an embodiment, when no packet loss is detected, when ECNs are not received, and the one-way latency is below the threshold value, the congestion window can be incremented upwards. In an embodiment, the upwards incrementing of the congestion window can be based on a number of acknowledgements and a current value of the congestion window. A non-limiting example of a method for determining the congestion window is described below and shown in FIG. 3. The method described below and shown in FIG. 3 can be used by the congestion window calculator(s) 208 to determine the respective congestion windows.

Flow control and fairness module(s) 210 are configured to adjust determined congestion window values to implement flow control and/or ensure fairness across a plurality of the sender(s) 204 providing packets of data to the receiver 202. The flow control and fairness module(s) 210 are each modules that can include software, hardware, combinations thereof, or the like and are provided as part of receiver 202. In an embodiment, a flow control and fairness module 210 is provided for each sender 204 sending packets to the receiver 202. In an embodiment, a plurality of the flow control and fairness modules 210 communicate with one another to adjust determined congestion window values to implement flow control and/or ensure fairness. In an embodiment, one flow control and fairness module can be provided, adjusting congestion windows from each of one or more congestion window calculator(s) 208, and outputting each respective adjusted congestion window to the respective congestion window token generator 212. The flow control and fairness module can adjust the congestion windows for various senders 204 based on the respective bandwidth consumption by each of the senders 204. In an embodiment, different senders 204 can receive different priorities or bandwidth allotments affecting the adjustment of congestion windows by the flow control and fairness module(s) 210.

Congestion window token generator(s) 212 is configured to generate an acknowledgement token for a packet received from a sender 204. The acknowledgement token can include an updated value for a congestion window to be provided to the sender 204. The updated value for the congestion window can be the value determined by the respective congestion window calculator 208 and optionally further adjusted by the flow control and fairness module(s) 210. The acknowledgement token can be sent from the receiver 202 to the respective sender 204 of a packet to confirm receipt of said packet and to provide the congestion window to be used by the respective sender 204 when sending packets to the receiver 202. The sender 202 can send the acknowledgement token including the value for the congestion window to the respective sender 204 by any suitable data connection, for example the connection used by sender 204 to provide the packets to the receiver 202.

FIG. 3 shows a flowchart of a method according to an embodiment. Method 300 includes determining, at a receiver of a network, whether packet loss has occurred at 302. The method 300 further includes determining, at the receiver of the network, whether a packet having a congestion signal has been received at 304. The method additionally includes determining a delay at 306 and comparing the delay to a target delay at 308. When packet loss is determined to have occurred at 302, a packet having a congestion signal is determined to have been received at 304, and/or the delay exceeds the target delay at 308, a congestion window can be adjusted downwards at 310. When no packet loss is determined to have occurred at 302, no packet having a congestion signal is determined to have been received at 304, and the delay is determined to be less than or equal to the target delay at 308, the congestion window can be adjusted upwards at 312. The adjusted congestion window can be provided to the sender at 314. In an embodiment, the method 300 can optionally include further adjusting the congestion window based on flow control and/or fairness at 316. Optionally, the sender can perform supplemental detection of packet loss at 318. When the sender detects packet loss in the supplemental detection of packet loss at 318, the congestion window can be adjusted downwards at 320.

Method 300 provides congestion and flow control network based on the perspective of a receiver of data packets. In an embodiment, method 300 is a method for updating a congestion window for a particular sender that sends packets of data to the receiver. Method 300 can be performed for a particular data flow from a particular sender when a packet of said data flow is received at the receiver. In the embodiment shown in FIG. 3, method 300 controls congestion and flow control based on, in order of priority, packet loss, receipt of a congestion signal, and delay in receiving sent packets. In an algorithm for performing an embodiment of method 300, a series of "else if" statements can be used according to the factors used for determining the congestion window and the priorities thereof. It is understood that, in alternate embodiments, one or more of the detection of packet loss, the congestion signal and/or the delay can be omitted from the method 300 when updating of the congestion window. It is understood that other suitable indicia of network congestion can also be used in place of or in addition to the detection of packet loss, the congestion signal and/or the delay in alternate embodiments. It is understood that, in alternate embodiments, the priorities can be varied in some approaches, for example, instead prioritizing receipt of the congestion signal or delay over packet loss when determining the update to the congestion window. In some embodiments, method 300 can be performed entirely at a receiver node of a network that is receiving packets of data from one or more sender nodes of the network. Optionally, method 300 can further include actions performed as sender nodes of the network, such as performing the supplemental detection of packet loss at 318 and the corresponding adjustment of the congestion window at 320.

The occurrence of packet loss is determined at the receiver at 302. The determination of packet loss at 302 can be by any suitable means of detection of packet loss that can be implemented at the receiver, for example determining when certain packets of data that are expected have not been received within a predetermined time window. The receiver can identify expected packets based on other received packets of a data flow. Packet loss can include packets being lost in the network or dropped from a queue at a host such as the end host. When packet loss is determined at 302, the method 300 can proceed towards adjusting the congestion window downwards at 310. When packet loss is not determined to have occurred at 302, the method 300 can instead proceed to determining whether a congestion signal has been received at 304. In an embodiment, the occurrence of packet loss is determined at 302 when any packet loss is detected. In an embodiment, the occurrence of packet loss is determined at 302 when packet loss exceeds a threshold value.

The presence of a congestion signal can be determined at 304. The presence of the congestion signal at 304 can be performed by reading or otherwise analyzing the received packets of the data flow from the sender. The sender can attach a congestion signal to the packet being sent when under congested conditions. The congestion signal can be any suitable signal for expressing that congestion is occurring, with a non-limiting example being an explicit congestion notification (ECN) provided by the sender. In an embodiment, congestion signals from multiple packets of a data flow can be tracked, such that the determination of the presence of the congestion signal also includes a ratio of the number of packets having the congestion signal to the overall number of packets of the data flow. When the congestion signal is determined to be present at 304, the method 300 can proceed to adjusting the congestion window downwards at 310. When the congestion signal is not determined to be present at 304, the method 300 can proceed to determining the delay at 306 or comparing the delay at 308.

A delay is determined at 306. The delay can be determined at 306 following determination that the congestion signal is not present at 304, or can be determined for each packet without regard to the determination of the congestion signal at 304. The delay can be determined at 306 by any suitable method of characterizing the latency in receiving packets that can be performed by the receiver node. The delay can be, for example, a one-way latency. The delay can be detected by, for example, a latency calculator 206 as described above and shown in FIG. 2. In an embodiment, the delay can be a one-way latency determined according to the formula $(T_{receiver}-T_{sender})+C$ as discussed above. In an embodiment, the delay can be determined at 306 based on one-way latencies over time, for example defining the delay as a minimum, maximum, average, or smoothed value for the one-way latency based on the one-way latencies for a plurality of packets received during a predetermined time window. The delay determined at 306 can be compared to a target or threshold delay at 308. The target or threshold delay at 308 can be, for example, a desired level of delay or a threshold value for delay indicative of a level of congestion requiring adjustment of congestion windows. When the delay determined at 306 is found to exceed the target or threshold delay in the comparison at 308, the method 300 can proceed to adjusting the congestion window downwards at 310. When the delay determined at 306 is found to be at or below the target or threshold delay in the comparison at 308, the method 300 can proceed to adjusting the congestion window upwards at 312. In alternative embodiments, the adjustment of the congestion window can further include maintaining the congestion window at a current value under certain conditions, for example when the delay is within a range at or near the target or threshold delay value, for example being within a predefined range that is defined around the target or threshold delay value.

When packet loss is determined at 302, a congestion signal is determined at 304, or a delay is found to exceed the target or threshold delay at 308, the congestion window can be adjusted downwards at 310. Adjusting the congestion window downwards at 310 instructs the sender to reduce the number of packets that can be sent before requiring acknowledgement of previously sent packets, thereby reducing the sending rate of the sender. The congestion window can be adjusted downwards at 310 by any suitable reduction scheme, such as multiplicative reduction, subtraction from the congestion window value, or the like.

In an embodiment, the adjustment of the congestion window downwards at 310 can be based on the particular basis for proceeding to 310, for example performing a first downwards adjustment when packet loss is determined at 302, performing a second, different downwards adjustment when the congestion signal is determined at 304, and performing a third, different downwards adjustment when it is determined at 308 that the delay exceeds the target or threshold delay.

In an embodiment, the adjustment of the congestion window downwards at 310 when packet loss is determined at 302 can be a multiplicative decrease of the congestion window, for example by dividing the congestion window by a suitable constant for responding to packet loss. In an embodiment, the constant can be 2, halving the congestion window in the downward adjustment at 310 when packet loss is determined at 302.

In an embodiment, adjustment of the congestion window downwards at 310 when the congestion signal is determined at 304 can be based on a ratio of packets including the congestion signal to a total number of packets. In an embodiment, the total number of packets is the total number of packets of the data flow. In an embodiment, the total number of packets used for determining the ratio is a total number of packets received within a predetermined time window. As one non-limiting example, when the congestion window is adjusted downwards at 310 based on the congestion signal being determined at 304, the congestion window can be adjusted according to the following formula: $CWND_{Adjusted} = CWND_{Current} * (1-[Packets_{Signal}/Packets_{Total}])$, where $CWND_{Adjusted}$ is the adjusted congestion window, $CWND_{Current}$ is the congestion window currently in use, and $Packets_{Signal}/Packets_{Total}$ is the ratio of packets including the congestion signal to the total number of packets.

In an embodiment, adjustment of the congestion window downwards at 310 when it is determined at 308 that the delay exceeds the target or threshold delay can be based on the values for the current delay and the target or threshold delay. In an embodiment, an adjustment factor can be calculated based on the based on the values for the current delay and the target or threshold delay, and the current congestion window can be multiplied by the adjustment factor to determine the adjusted congestion window. In an embodiment, the adjustment factor can be based on a ratio of the current delay minus the target or threshold delay. In an embodiment, a maximum decrease can also be provided, limiting the extent to which the congestion window can be adjusted downwards at 310 in response to the delay exceeding the target or threshold delay at 308. In one non-limiting example, the congestion window can be determined according to the following formula: $CWND_{Adjusted} = CWND_{Current} * \max([1-B*\{Delay_{Current}-Delay_{Target}\}/Delay_{Current}], MaxDecrease)$, where $Delay_{Current}$ is the current value of the delay determined at 306, $Delay_{Target}$ is the target or threshold delay value, and MaxDecrease is a predetermined maximum for the reduction in congestion window in response to the delay exceeding the target or threshold delay.

Adjusting congestion window upwards can be performed at 312, for example when no packet loss is determined at 302, no congestion signal is determined at 304, and the delay does not exceed the target or threshold delay at 308. The upwards adjustment performed at 312 can be, for example, an additive increase in the congestion window, for example by incrementing the congestion window. The congestion window can be incremented by an amount based on a number of acknowledgements of packets received by the sender. As one non-limiting example, the adjusting of the congestion window upwards at 312 can be determined according to the following formula: $CWND_{Adjusted} = CWND_{Current} + A*(Acknowledgements/CWND_{Current})$, where A is a predetermined constant, and Acknowledgements is the number of acknowledgements of packets received by the sender.

The congestion window can be provided to the sender 314. In an embodiment, the congestion window is provided to the sender at 314 when the congestion window has been adjusted downwards at 310 or adjusted upwards at 312. In an embodiment, the congestion window is provided to the sender 314 even when no adjustment is made to the congestion window. The congestion window can be provided to the sender as a portion of the acknowledgement of the receipt of the packet, for example as a token included in the acknowledgement or the like. The acknowledgement including the congestion window can be provided to the sender at 314 by any suitable communications of the acknowledgement. The sender can then control sending to the receiver in accordance with the congestion window at 314, adjusting the rate of sending from the sender based on the congestion window as determined at the receiver.

Optionally, the congestion window can be further adjusted based on flow control and/or fairness at 316. The further adjustment of the congestion window at 316, when performed, can be performed prior to the providing of the congestion window to the sender at 314. The adjustments based on flow control and/or fairness at 316 can be based on the available bandwidth and the respective bandwidths allocated for particular data flows. In an embodiment, the adjustments based on flow control and/or fairness at 316 treat each sender equally when allocating bandwidth among data flows from various senders. In an embodiment, different senders can have different bandwidth allocations, priorities for bandwidth allocation, or the like, and the adjustment based on flow control and/or fairness at 316 can be based on such allocation, priorities, or the like. In a non-limiting example, an average bandwidth can be determined by dividing the current total bandwidth capacity by the total number of active data flows. In this non-limiting example, when the congestion window is such that a data flow is at or below an average bandwidth, the congestion window for the data flow can be used without further adjustment. The bandwidth used by flows that are at or below the average bandwidth can be subtracted from the current total bandwidth to determine an adjusted total bandwidth, and the congestion windows for data flows using bandwidth exceeding the average bandwidth can be adjusted such that the adjusted total bandwidth is allocated equally to each of said data flows using bandwidth exceeding the average bandwidth.

In embodiments, the senders can further contribute to the congestion and flow control in method 300. The senders can perform a supplemental detection of packet loss at 318. The supplemental detection of packet loss can be for packets where packet loss may not be observable by the receiver, such as, for example the first and/or last packets of a data stream. The detection of packet loss can be according to any suitable sender-side detection of packet loss, for example timing out without receiving acknowledgement from the receiver. When the supplemental detection of packet loss at 318 shows packet loss that may not be observable by the receiver, the sender can perform a local downward adjustment of the congestion window at 320. The local downward adjustment at 320 can be according to any suitable scheme for responding to packet loss detected by the sensor. In an embodiment, the downward adjustment of the congestion window at 320 can be similar to or according to the same adjustment as made at 310 in response to the detection of packet loss. As a non-limiting example, when packet loss is detected in the supplemental detection of packet loss at 318, the congestion window at the sender can be divided by a predetermined constant value. In an embodiment, the predetermined constant value can be 2, such that the congestion window is halved on detection of packet loss at 318.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices; magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects

It is understood that any of aspects 1-10 can be combined with any of aspects 11-20, 21-22, 23, 24, or 25. It is understood that any of aspects 11-20 can be combined with any of aspects 21-22, 23, 24, or 25. It is understood that any of aspects 21-22 can be combined with any of aspects 23, 24, or 25. It is understood that any of aspects 23, 24, and 25 can be combined with one another.

Aspect 1. A computer network, comprising:
a receiver node configured to receive packets of data from one or more sender nodes, the receiver node configured to:
determine network congestion;
based on the determining of network congestion, determine a congestion window for the one or more sender nodes; and
transmit the congestion window to the one or more sender nodes.

Aspect 2. The computer network according to aspect 1, wherein the sender node is configured to determine network congestion by:
detecting packet loss in the packets of data received from the one or more sender nodes;
detecting an explicit congestion notification (ECN) in the packets of data received from the one or more sender nodes; and
determining a one-way latency of the packets of data received from the one or more sender nodes.

Aspect 3. The computer network according to aspect 1 or aspect 2, further comprising the one or more sender nodes, and wherein each of the one or more sender nodes are configured to receive the congestion window for said sender node from the receiver node, and control the sending of packets from said sender node based on the congestion window.

Aspect 4. The computer network according to aspect 3, wherein at least some of the one or more sender nodes are configured to detect packet loss for first and final packets of the packets of data sent from said sender note to the receiver node and reduce the congestion window when the packet loss for first and final packets is detected.

Aspect 5. The computer network according to any of aspects 2-4, wherein the receiver node is configured to determine the one-way delay by determining a difference between a time at the receiver and a timestamp at a sending for a plurality of packets of the packets of data from the one or more sender nodes.

Aspect 6. The computer network according to any of aspects 2-5, wherein the receiver node is configured such that when the packet loss is detected by the receiver node, the receiver node determines to reduce the congestion window.

Aspect 7. The computer network according to any of aspects 2-6, wherein the receiver node is configured such that when packet loss is not detected by the receiver node and the ECN is detected by the receiver node, the receiver node determines to reduce the congestion window.

Aspect 8. The computer network according to any of aspects 2-7, wherein the receiver node is configured such that when packet loss is not detected by the receiver node and the ECN is not detected by the receiver node, one-way latency is compared to a target one-way latency, and when the one-way latency exceeds the target one-way latency, the receiver node determines to reduce the congestion window.

Aspect 9. The computer network according to any of aspects 1-8, wherein the receiver node is further configured to adjust the congestion window for a respective one of the one or more sender nodes based on a comparison of a bandwidth for a flow from the respective sender note to an average bandwidth of flows from the one or more sender nodes.

Aspect 10. The computer network according to aspect 9, wherein different sender nodes of the one or more sender nodes have differing priorities, and the receiver node is configured to adjust the congestion window based on the priority of the respective sender node.

Aspect 11. A method for controlling flow in a computer network, comprising:
at a receiver node configured to receive packets of data from one or more sender nodes, determining network congestion;
determining, at the receiver node, a congestion window for the one or more sender nodes based on the determining of the network congestion; and
transmitting the congestion window from the receiver node to the one or more sender nodes.

Aspect 12. The method according to aspect 11, wherein the determining of network congestion includes at least one of:
at the receiver node, detecting packet loss in the packets of data received from the one or more sender nodes;
at the receiver node, detecting an explicit congestion notification (ECN) in the packets of data received from the one or more sender nodes; or at the receiver node, determining a one-way latency of the packets of data received from the one or more sender nodes.

Aspect 13. The method according to aspect 11 or aspect 12, further comprising receiving, at the one or more sender nodes, the congestion window for said sender node from the receiver node, and operating said sender node to send packets to the receiver node based on the congestion window.

Aspect 14. The method according to aspect 12, further comprising detecting, at the one or more sender nodes, packet loss for first and final packets of the packets of data sent from said sender note to the receiver node and reduce the congestion window when the packet loss for first and final packets is detected.

Aspect 15. The method according to any of aspects 12-14, wherein determining the one-way delay includes determining a difference between a time at the receiver and a timestamp at a sending for a plurality of packets of the packets of data from the one or more sender nodes.

Aspect 16. The method according to any of aspects 12-15, wherein when the packet loss is detected by the receiver node, the receiver node determines to reduce the congestion window.

Aspect 17. The method according to any of aspects 12-16, wherein when packet loss is not detected by the receiver node and the ECN is detected by the receiver node, the receiver node determines to reduce the congestion window.

Aspect 18. The method according to any of aspects 12-17, wherein when packet loss is not detected by the receiver node and the ECN is not detected by the receiver node, one-way latency is compared to a target one-way latency, and when the one-way latency exceeds the target one-way latency, the receiver node determines to reduce the congestion window.

Aspect 19. The method according to any of aspects 11-18, further comprising adjusting the congestion window for a respective one of the one or more sender nodes based on a comparison of a bandwidth for a flow from the respective sender note to an average bandwidth of flows from the one or more sender nodes.

Aspect 20. The method according to any of aspects 11-19, wherein different sender nodes of the one or more sender nodes have differing priorities, adjusting the congestion window based on the priority of the respective sender node.

Aspect 21. A non-transitory computer-readable medium having computer-executable instructions stored thereon that, upon execution, cause one or more processors of a receiver node of a computer network to perform operations comprising:
detecting an explicit congestion notification (ECN) in the packets of data received from the one or more sender nodes;
determining a one-way latency of the packets of data received from the one or more sender nodes;
determining a congestion window for the one or more sender nodes based on at least one of the detection of packet loss, detection of the ECN, or the one-way latency; and
transmitting the congestion window from the receiver node to the one or more sender nodes.

Aspect 22. The non-transitory computer-readable medium according to aspect 21,
wherein determining the congestion window includes:
when the packet loss is detected by the receiver node, determining to reduce the congestion window;
when packet loss is not detected by the receiver node and the ECN is detected by the receiver node, determining to reduce the congestion window; and
when packet loss is not detected by the receiver node and the ECN is not detected by the receiver node, one-way latency is compared to a target one-way latency, and when the one-way latency exceeds the target one-way latency, determining to reduce the congestion window.

Aspect 23. A computer network, comprising:
a receiver node configured to receive packets of data from one or more sender nodes, the receiver node configured to:
based on detection of one of packet loss, a congestion signal and a packet latency signal, from one or more sender nodes, dynamically adjust a congestion window to be sent to the one or more sender nodes; and
transmit the congestion window to the one or more sender nodes.

Aspect 24. A method for controlling flow in a computer network, comprising:
at a receiver node configured to receive packets of data from one or more sender nodes, based on detection of one of packet loss, a congestion signal and a packet latency signal, from one or more sender nodes, dynamically adjusting a congestion window to be sent to the one or more sender nodes; and
transmitting the congestion window from the receiver node to the one or more sender nodes.

Aspect 25. A non-transitory computer-readable medium having computer-executable instructions stored thereon that, upon execution, cause one or more processors of a receiver node of a computer network to perform operations comprising:
based on detection of one of packet loss, a congestion signal and a packet latency signal, from one or more sender nodes, dynamically adjusting a congestion window to be sent to the one or more sender nodes; and
transmitting the congestion window from the receiver node to the one or more sender nodes.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A computer network, comprising:
a receiver node, wherein the receiver node is configured to:
receive packets of data from one or more sender nodes;
determine network congestion for each of the one or more sender nodes based on one or more of the following:
detecting packet loss in the packets of data received from the one or more sender nodes;
detecting an explicit congestion notification (ECN) in the packets of data received from the one or more sender nodes; or
determining a one-way latency of the packets of data received from the one or more sender nodes;
wherein detection of the packet loss, detection of the ECN, and determination of the one-way latency are prioritized in a descending order for determining a congestion window, and wherein the detection of the packet loss, the detection of the ECN, and the determination of the one-way latency are associated with respective reductions of the congestion window;

after determining the network congestion at the receiver node, determine, at the receiver node, a congestion window for a respective one of the one or more sender nodes based on the descending order of the detection of the packet loss, the detection of the ECN, and the determination of the one-way latency and the respective reductions of the congestion window; and transmit the congestion window to the respective one of the one or more sender nodes.

2. The computer network of claim 1, further comprising the one or more sender nodes, wherein each of the one or more sender nodes is configured to:

receive the congestion window for the sender node from the receiver node; and control sending of packets from the sender node based on the congestion window.

3. The computer network of claim 2, wherein at least one sender node of the one or more sender nodes is configured to detect packet loss for first and final packets of the packets of data sent from the at least one sender node to the receiver node and reduce the congestion window when the packet loss for first and final packets is detected.

4. The computer network of claim 1, wherein the receiver node is configured to determine the one-way latency by determining a difference between a time at the receiver node and a timestamp at a sending for a plurality of packets of the packets of data from the one or more sender nodes.

5. The computer network of claim 1, wherein the receiver node is configured such that when the packet loss is detected by the receiver node, the receiver node determines to reduce the congestion window.

6. The computer network of claim 1, wherein the receiver node is configured such that when packet loss is not detected by the receiver node and the ECN is detected by the receiver node, the receiver node determines to reduce the congestion window.

7. The computer network of claim 1, wherein the receiver node is configured such that when packet loss is not detected by the receiver node and the ECN is not detected by the receiver node, the one-way latency is compared to a target one-way latency, and when the one-way latency exceeds the target one-way latency, the receiver node determines to reduce the congestion window.

8. The computer network of claim 1, wherein the receiver node is further configured to adjust the congestion window for a respective one of the one or more sender nodes based on a comparison of a bandwidth for a flow from the respective sender node to an average bandwidth of flows from the one or more sender nodes.

9. The computer network of claim 8, wherein different sender nodes of the one or more sender nodes have differing priorities, and the receiver node is configured to adjust the congestion window based on the priority of the respective sender node.

10. A method for controlling flow in a computer network, comprising:

receiving, at a receiver node of the computer network, packets of data from one or more sender nodes;

determining, at the receiver node, network congestion for each of the one or more sender nodes based on one or more of the following:

detecting packet loss in the packets of data received from the one or more sender nodes;

detecting an explicit congestion notification (ECN) in the packets of data received from the one or more sender nodes; or determining a one-way latency of the packets of data received from the one or more sender nodes;

wherein detection of the packet loss, detection of the ECN, and determination of the one-way latency are prioritized in a descending order for determining a congestion window, and wherein the detection of the packet loss, the detection of the ECN, and the determination of the one-way latency are associated with respective reductions of the congestion window;

determining, at the receiver node, a congestion window for a respective one of the one or more sender nodes based on the descending order of the detection of the packet loss, the detection of the ECN, and the determination of the one-way latency and the respective reductions of the congestion window; and transmitting the congestion window from the receiver node to the respective one of the one or more sender nodes.

11. The method of claim 10, further comprising:

receiving, at each of the one or more sender nodes, the congestion window for a respective sender node from the receiver node, and operating the respective one of the one or more sender node to send packets to the receiver node based on the congestion window.

12. The method of claim 11, further comprising:

detecting, at each of the one or more sender nodes, packet loss for first and final packets of the packets of data sent from the sender node to the receiver node; and reducing the congestion window when the packet loss for first and final packets is detected.

13. The method of claim 10, wherein determining the one-way latency includes determining a difference between a time at the receiver node and a timestamp at a sending for a plurality of packets of the packets of data from the one or more sender nodes.

14. The method of claim 10, wherein when the packet loss is detected by the receiver node, the receiver node determines to reduce the congestion window.

15. The method of claim 10, wherein when packet loss is not detected by the receiver node and the ECN is detected by the receiver node, the receiver node determines to reduce the congestion window.

16. The method of claim 10, wherein when packet loss is not detected by the receiver node and the ECN is not detected by the receiver node, the one-way latency is compared to a target one-way latency, and when the one-way latency exceeds the target one-way latency, the receiver node determines to reduce the congestion window.

17. The method of claim 10, further comprising adjusting the congestion window for a respective one of the one or more sender nodes based on a comparison of a bandwidth for a flow from the respective sender node to an average bandwidth of flows from the one or more sender nodes.

18. The method of claim 10, wherein different sender nodes of the one or more sender nodes have differing priorities, adjusting the congestion window based on the priority of the respective sender node.

19. A non-transitory computer-readable medium having computer-executable instructions stored thereon that, upon execution, cause one or more processors of a receiver node of a computer network to perform operations comprising:
  receiving packets of data from one or more sender nodes;
  detecting packet loss in the packets of data received from the one or more sender nodes;
  detecting an explicit congestion notification (ECN) in the packets of data received from the one or more sender nodes;
  determining a one-way latency of the packets of data received from the one or more sender nodes, wherein detection of the packet loss, detection of the ECN, and determination of the one-way latency are prioritized in a descending order for determining a congestion window, and wherein the detection of the packet loss, the detection of the ECN, and the determination of the one-way latency are associated with respective reductions of the congestion window;
  determining a congestion window for a respective one the one or more sender nodes based on the descending order of the detection of the packet loss, the detection of the ECN, and the determination of the one-way latency and the respective reductions of the congestion window; and
  transmitting the congestion window from the receiver node to the respective one of the one or more sender nodes.

20. The non-transitory computer-readable medium of claim 19, wherein determining the congestion window includes:
  when the packet loss is detected by the receiver node, determining to reduce the congestion window;
  when packet loss is not detected by the receiver node and the ECN is detected by the receiver node, determining to reduce the congestion window; and
  when packet loss is not detected by the receiver node and the ECN is not detected by the receiver node, one-way latency is compared to a target one-way latency, and when the one-way latency exceeds the target one-way latency, determining to reduce the congestion window.

* * * * *